United States Patent [19]

Dougherty et al.

[11] Patent Number: 5,417,461
[45] Date of Patent: May 23, 1995

[54] TUBE-TO-HOSE COUPLING (CRIMP-SERT) AND METHOD OF MAKING SAME

[75] Inventors: Michael L. Dougherty, Sanford; Norman E. Warner, Winter Springs, both of Fla.

[73] Assignee: S&H Fabricating and Engineering, Inc., Sanford, Fla.

[21] Appl. No.: 111,979

[22] Filed: Aug. 25, 1993

[51] Int. Cl.⁶ ............................................. F16L 33/20
[52] U.S. Cl. .................................. 285/256; 285/382; 29/506
[58] Field of Search ............... 285/256, 259, 149, 382; 29/506, 508, 546

[56] References Cited

U.S. PATENT DOCUMENTS

| | | | |
|---|---|---|---|
| 863,745 | 8/1907 | Nelson et al. | 285/149 |
| 2,133,313 | 10/1936 | Weatherhead | 285/256 |
| 2,374,226 | 4/1945 | Melsom | 285/256 |
| 2,453,997 | 11/1948 | MacWilliams | 285/259 |
| 2,485,976 | 10/1949 | Main | 285/256 |
| 2,499,241 | 2/1950 | Courtot | 285/256 |
| 2,572,645 | 10/1951 | Melsom | 285/84 |
| 3,467,414 | 6/1969 | Downing | 285/382.2 |
| 3,471,180 | 10/1969 | Grawey et al. | 285/259 |
| 3,539,207 | 11/1970 | Harris | 285/256 |
| 3,549,180 | 12/1970 | MacWilliams | 285/256 |
| 3,990,729 | 11/1976 | Szentmilhaly | 285/109 |
| 4,064,614 | 12/1977 | Horvath | 285/256 |
| 4,142,554 | 3/1979 | Washkewicz et al. | 138/109 |
| 4,226,446 | 10/1980 | Burrington | 285/256 |
| 4,548,430 | 10/1985 | Haubert et al. | 285/256 |
| 4,906,030 | 3/1990 | Yokomatsu et al. | 285/256 |
| 5,044,671 | 9/1991 | Chisnell et al. | 285/55 |

FOREIGN PATENT DOCUMENTS

| | | | |
|---|---|---|---|
| 499819 | 8/1992 | European Pat. Off. | 285/256 |
| 1253533 | 11/1967 | Germany | 285/149 |

Primary Examiner—Dennis L. Taylor
Assistant Examiner—Heather Chun Shackelford
Attorney, Agent, or Firm—Brooks & Kushman

[57] ABSTRACT

A hose coupling comprising a metal tube and a cylindrical insert concentrically arranged and held fast within the tube. The tube includes a radially outwardly flared sleeve integral with the tube and providing a tube end and a stop shoulder at the juncture at which said sleeve is flared outwardly. The insert includes (i) a barrel portion extending substantially the full length of the insert and (ii) a radially outwardly flared integral collar at one end of the barrel portion. The collar has an end face abutting the tube stop shoulder, an opposed hose end face, and a tapered circumferential land engaging the sleeve and extending axially at an outwardly diverging uniform taper from the tube end face to the hose end face. The sleeve is preformed to include a circumferential seat portion for seating the collar with the seat portion diverging outwardly at a uniform taper equal to that of the collar and beginning at the tube stop shoulder and continuing to a point at least equal to the length of said collar. A flexible hose is held within the sleeve and supported on the insert barrel portion and abutting the hose end face of the collar. In one crimping operation both the insert and hose may be secured to the metal tube.

9 Claims, 2 Drawing Sheets

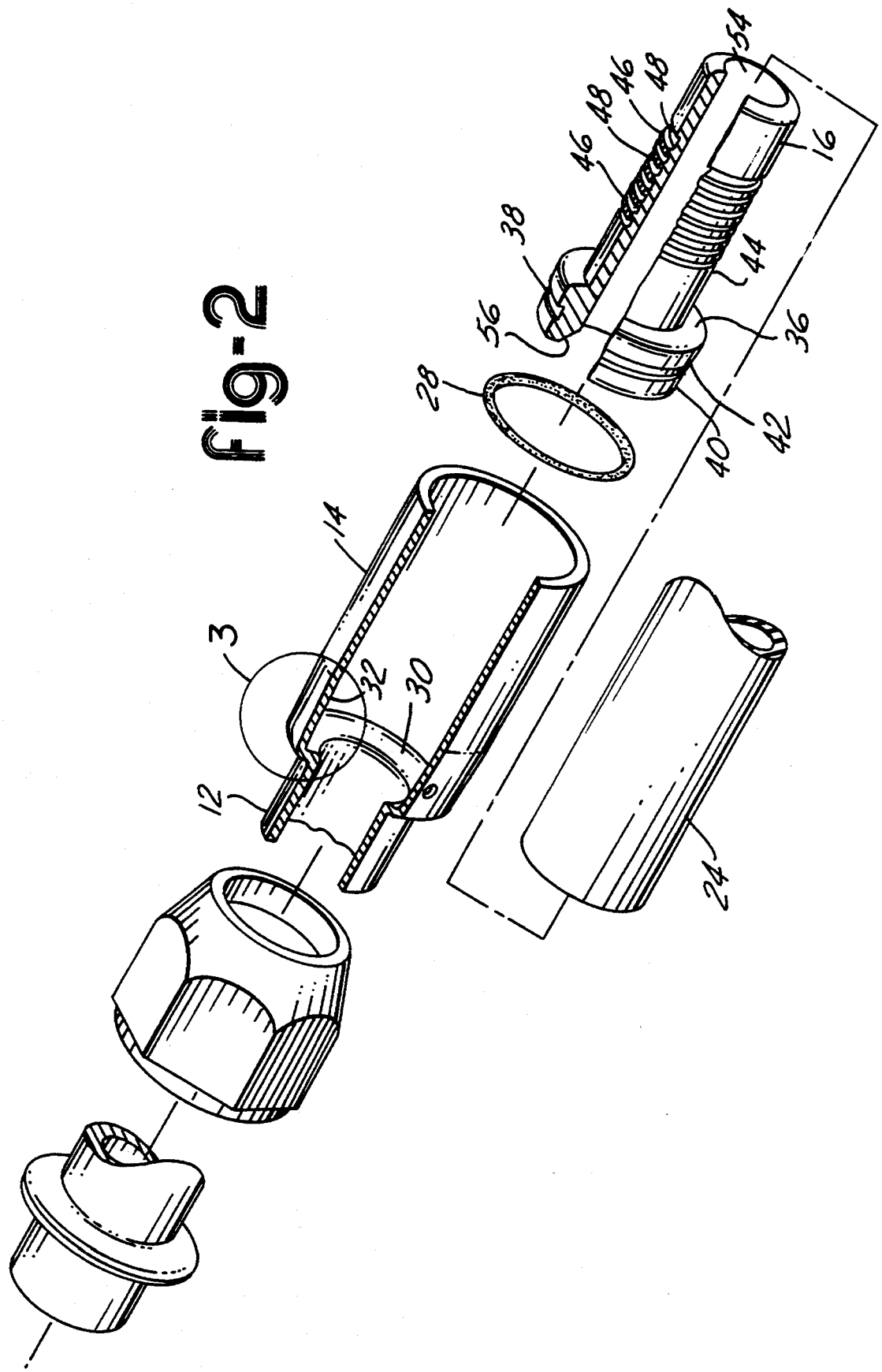

TUBE-TO-HOSE COUPLING (CRIMP-SERT) AND METHOD OF MAKING SAME

TECHNICAL FIELD

This invention relates to crimp-type tube-to-hose couplings and methods of making this type of coupling, with particular adaptation for vehicular air conditioning systems and similar sealed fluid conducting systems.

BACKGROUND ART

In every vehicular air conditioning system there is a plurality of sections of flexible hosing. These hose sections connect together, in a single system, the various system components including a compressor, condenser, etc. A coupling member is required at each hose end to allow the hose to be secured to the various components between which it extends. The coupling member will usually include one portion of a threaded fastener such as a captured, rotatable nut, or similar means of connection to a system component. The usual manner of securing the flexible hose to the coupling member is to utilize a coupling member having two concentric cylindrical portions spaced from one another by about the approximate thickness of the hose. One of these concentric members includes a radial extending flange securing it to the other member. The inner concentric member includes a throughbore having a diameter approximately equal to the inside diameter of the hose to which it is being coupled. During assembly, the hose is slipped over the inner concentric cylinder and the outer concentric cylinder is then crimped down upon the hose and the other member to form a fluid-type joint.

A typical coupling of this type is shown in U.S. Pat. No. 5,044,671, which is assigned to the assignee of the present invention. As will be noted from the '671 patent, the outer concentric member or sleeve of the coupling is in the shape of a cup such that it includes a radial flange extending radially inward toward the inner concentric tube. The flange includes a throughbore. To assemble the sleeve, the inner concentric member or tube is provided with annular locking ribs and the radial flange is then swaged onto the locking ribs of the tube. Alternatively, the inner tube may be upset, or otherwise provided with a radial shoulder, immediately adjacent and contiguous with both sides of the radial flange of the sleeve so as to provide an axial stop in both directions. In each case, the axial position of the two coupling components, i.e., the sleeve and the tube, is fixed relative to one another. It is not a fluid-tight seal and need not be since the sealing is done between the hose and the coupling member in the areas of the above-described crimp. It does require a number of metal forming operations on the same tube member, which in turn burdens product reliability concerns as well as adding to product cost.

The present invention is directed toward eliminating the need for anything more than a single upsetting operation coupled with the conventional crimping step thereby improving product reliability and reducing product cost.

SUMMARY OF THE INVENTION

The present invention contemplates a simple and economical construction of a crimp-type hose-to-tube coupling. The invention further contemplates the above-described type coupling wherein the coupling tube is integral, one piece construction with the portion of the coupling constituting the crimped sleeve, and wherein a premanufactured insert and hose assembly may be inserted within the sleeve and crimped in one operation thereby securing (i) the insert to the sleeve and (ii) the hose between the sleeve and insert in one crimping operation.

The invention further contemplates a hose coupling as used in vehicle air conditioning systems comprising an aluminum alloyed tube of substantially uniform thickness having an expandable radially outwardly flared integral sleeve at one tube end and concentric with the tube. A radially extending tube shoulder is defined at the juncture at which the sleeve is flared outward. A tubular cylindrical insert having a throughbore concentric with the tube axis is permanently fixed to the tube. The insert includes a radially outwardly flared integral collar at its fixed end. The collar includes a tube end face abutting the tube shoulder and an opposed hose end face upon which the hose may abut when inserted over the insert prior to crimping the sleeve down upon the hose and insert.

The invention also contemplates a method of assembling a coupling as above-described including the steps of the hose being held in fixed sealed relation to the sleeve and the insert by means of a series of crimps along the sleeve and radially over the sealing and locking grooves whereby the hose is compressed and extruded within the sealing and locking grooves.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is an exploded view of the hose coupling of the present invention as each of the components are to be assembled prior to the crimping operation;

BEST MOST FOR CARRYING OUT THE INVENTION

Figure 1:
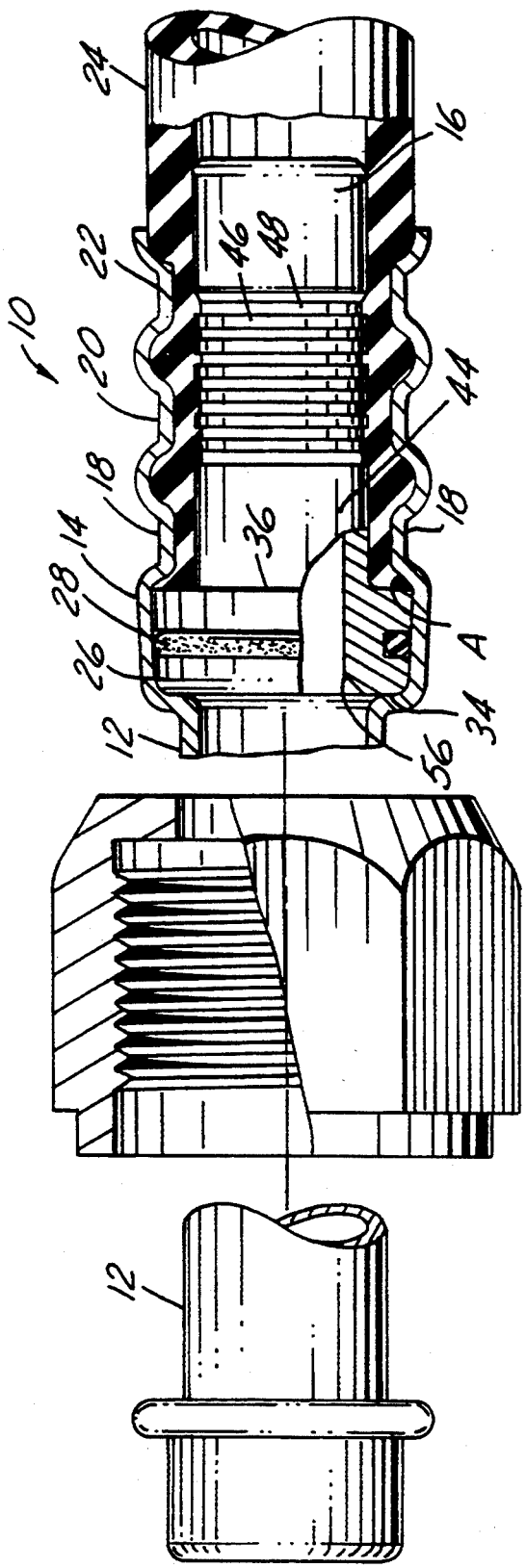
FIG. 1 is a partial cross-sectional view of the hose coupling of the present invention shown in its fully assembled state.
Figure 4:
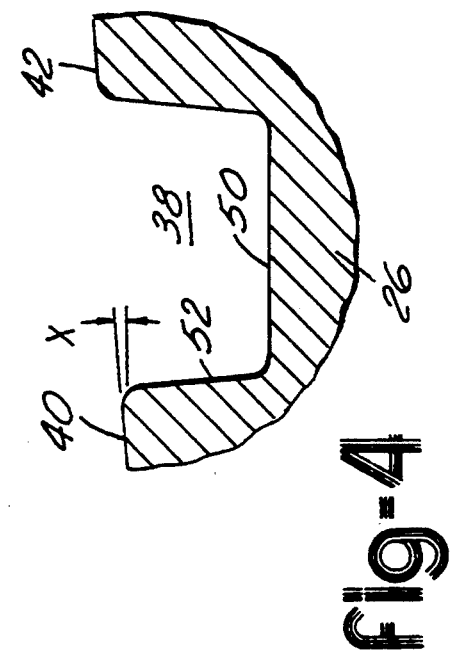
FIG. 4 is an enlarged view of a portion of the coupling insert prior to assembly within the coupling tube.

Referring now to FIGS. 1 through 4, there is illustrated a hose coupling generally designated 10. The hose coupling 10, when assembled as described in greater detail below, forms a leak-proof joint having many fluid conveying applications, though particularly suited for use in a vehicular air conditioning system. The hose coupling 10 includes an aluminum alloyed tube 12 having a radially enlarged sleeve 14 at one end. A suitable alloy for tube 12 is 3000 Series aluminum. An insert 16 of high strength aluminum alloy such as 6061T6 series aluminum concentric with the tube 12 is held in place within the sleeve by means of the sleeve 14 being crimped over the enlarged collar end of the insert 16, as shown at FIG. 1. The crimp rib 18 includes a rib face contacting the collar at a point A. The same crimping operation holds a flexible hose 24 axially affixed and sealed relative to the sleeve and the insert, as shown at ribs 18,20,22. The collar 26 of the insert is further provided with a seal, such as an O-ring 28, partially or fully compressed within the collar by the sleeve and thereby effectively precluding any flow of refrigerant fluid from the bore of the coupling around the periphery of the collar and along the hose/sleeve interface. At the other end of the tube 12 is a flanged nut 11 retained on the tube by flange 13 formed by a conventional upsetting operation.

Figure 3:
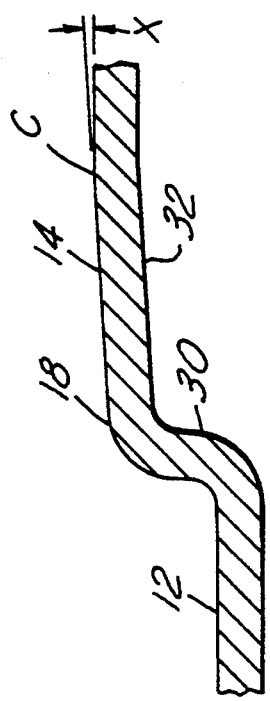
FIG. 3 is an enlarged view of a portion of the coupling tube as shown in FIG. 2.

More specifically, as shown in FIG. 2, the tube 12 is seen to be an integral one piece tubular construction having a radially enlarged sleeve 14 at one end as can be formed by a conventional metal forming technique such as upsetting. A preferred method is to upset the end of the tube within a fixed die using an enlarged mandrel to radially expand the tube walls to the shape as shown in FIG. 2, and at the same time to form a radial stop shoulder 30 at the juncture of the tube and expanded sleeve. In FIG. 3, particularly, it will be noted that the radial shoulder 30 lies generally within a plane transverse no the axis of the coupling. Beginning at the radially outward juncture of shoulder 30 with the sleeve 14, the sleeve is radially outwardly tapered at an angle x from a minor diameter at point B to a major diameter at point C over a length that at least equals, and preferably exceeds, the length of the collar 26, described below. From point C to the end of the sleeve, the sleeve is cylindrical having an inner diameter just slightly greater than the major diameter of the collar 26. Again, from FIG. 2 principally, the insert 16 is seen to include a collar 26 which is tapered at its outer periphery complementary to that of the tapered radial seat 32 of the sleeve. The collar taper begins at a minor diameter starting at the tube end face 34 and continuing axially to the collar hose end face 36 to define a circumferential outer face or land 35. The minor diameter of the collar is equal to and preferably slightly greater than the minor diameter of the sleeve radial seat 32. The degree of taper for the sleeve and collar is substantially equal and may fall in the range of one to five degrees, preferably using a 3° Morris taper.

Centered on the tapered circumferential land 35 between the end faces 34, 36 of the collar is an annular sealing groove 38 for retaining O-ring 28. The axial length of the groove 38 is maintained at a minimum, i.e. less than the adjacent tapered lands 40, 42 to allow maintaining the overall collar length at a minimum while requiring adequate strength to accept the collar compressor loads without adversely affecting the radial clamp strength along the tapered interface. The O-ring 28 and groove 38 are sized such that as installed the O-ring will fill from 80% to 100% of the sealing groove and be compressed to a value ranging from about 10% to no more than about 35% of the unstressed O-ring. The degree of O-ring compression is defined as the difference of the initial uncompressed diameter of the O-ring plus the radial length to which such diameter is reduced, i.e. the minor diameter, when the insert 16 is assembled and crimped to the sleeve 14 divided by the initial uncompressed diameter of the O-ring (and multiplied by 100 to state the product as a percentage). At 100% sealing groove fill or less, this radial length will equal the sealing groove depth.

The remainder of the insert 16 comprises a barrel portion 44 which is cylindrical and extends axially to a point where in its assembled condition it extends slightly beyond the end of the sleeve 14 to thereby act as a pilot for locating the hose in accordance with one method of assembly. Centered between the collar hose end face 36 and the end of the insert 16 is a series of locking ribs 46 and grooves 48. The ribs are equally spaced and of uniform axial length. Likewise, the grooves 48 are equally spaced and of uniform length, with the length of the ribs 46 and grooves 48 being approximately equal. In a preferred form, these same locking ribs and grooves 46, 48 as well as the O-ring sealing groove 38 are machined from the insert and include a bottom wall 50 parallel with the insert axis and side walls 52 lying transversely to the insert axis. The insert includes a throughbore 54 which at a point 56 just beyond the collar sealing groove 38 expands radially towards the radial shoulder. It opens to a diameter approximately equal to that of the inner diameter of tube 12, thereby providing a transition zone for the refrigerant fluid as it flows through the coupling.

An important feature of the invention is that the insert be strong enough to accept the radial clamp forces on it during the crimping operation. In part, this criteria is met by materials selection, i.e high strength aluminum. It is also met by maintaining wall thickness, e.g. for a 1 inch nominal size hose the insert 16 wall thickness is 0.076-0.082 inches and the groove 38 depth is 0.008-0.015 inches.

For assembly, after forming both the sleeve 14 and insert 16 as separate components, the steps of assembly include the following in sequential order:

(a) inserting the O-ring 28 on the insert collar 26, (b) inserting the insert 16 into the hose 24, (c) inserting the combined insert and hose sub assembly 16/24 within the sleeve 14 to a point causing the insert to fully seat at its collar with the radial seat 32 of the sleeve, (d) placing the hose and tube coupling in a subassembly within a crimping station, and (e) crimping the outer sleeve in a manner causing the crimp 18 to engage the hose end face 36 of the collar forcing it, together with the force of the extruded hose, against the radial shoulder 30.

It is preferred, although not required, that there be direct contact between the crimp and the end face 36 of the collar to thereby hold the collar in compression against the radial shoulder 30 for maximum sealing. Likewise, if the collar O.D. in the area of the radial seat 30 is slightly oversized, a slight degree of radial expansion of the sleeve (i.e. plastic deformation) can be anticipated as the collar is forced home against the radial shoulder 30; this helps to assure a good seal at the collar/sleeve interface as well as providing certain antirotational features between the sleeve and collar. As shown in FIG. 1, at least one and perhaps two of the remaining crimps 20, 22 will be located radially above the locking ribs and grooves 46, 48 of the insert thereby forcing the hose to be extruded within the locking grooves to enhance the actual locking of the hose relative to the insert and sleeve as well as providing full sealing between the hose, sleeve, and insert.

The coupling is thereby provided with a three part sealing system including the O-ring 28 as one seal, the extruded hose at the point A constituting a second seal, and the locking ribs and grooves 46, 48 as a third seal.

Alternatively to installing the insert within the hose, step (b), the insert may be first inserted in the sleeve and thereafter the hose may be inserted within the insert/sleeve sub assembly, and crimped.

While the best mode for carrying out the invention has been described in detail, those familiar with the art to which this invention relates will recognize various alternative designs and embodiments for practicing the invention as defined by the following claims.

What is claimed:

1. A hose coupling comprising a metal tube having a longitudinal axis and being of substantially uniform wall thickness, a radially outwardly flared sleeve integral with said tube and providing a tube end, a radially extending tube stop shoulder being defined at the juncture at which said sleeve is flared outwardly;

a tubular cylindrical insert;

said insert including (i) a barrel portion extending substantially the full length of said insert and (ii) a radially outwardly flared integral collar at one end of said barrel portion;

said insert having a throughbore concentric with the tube axis and begin concentrically disposed within said sleeve;

said collar having a tube end face abutting said tube stop shoulder and an opposed hose end face;

said collar begin fixed to said sleeve, said sleeve including means for holding said collar in compression against said tube shoulder;

said collar including a tapered circumferential land engaging said sleeve and extending axially at an outwardly diverging uniform taper from said tube end face to said hose end face;

said sleeve being preformed to include a circumferential seat portion for seating the collar, said seat portion diverging outwardly at a uniform taper equal to that of said collar and beginning at said tube stop shoulder and continuing along said axis to a point at least equal to the length of said collar; and a flexible hose being held within the sleeve and supported on the insert barrel portion and abutting said hose end face of the collar.

2. A hose coupling as defined in claim 1 wherein, said collar further including seal means for sealing the juncture between said sleeve and said collar.

3. A hose coupling as defined in claim 2 wherein, said collar includes an annular sealing groove, and an O-ring seal element disposed within said sealing groove and held in compression by said sleeve, and thereby providing said seal means between the sleeve and collar.

4. A hose coupling as defined in claim 2 wherein, said insert barrel portion extends from said collar a distance slightly beyond said sleeve to thereby provide a pilot end for inserting a flexible hose within the coupling.

5. A hose coupling as defined in claim 4 wherein, said barrel portion includes a series of equally spaced locking and sealing grooves of substantially uniform depth and width and providing a series of equally spaced hose locking and sealing ribs of substantially uniform width between each pair of said grooves.

6. A hose coupling as defined in claim 1 wherein, said sleeve is crimped at a point just beyond said hose end face of the collar in the direction of said barrel portion whereby the collar and thereby the insert is held in compression against the tube stop shoulder by means of the sleeve crimp.

7. A hose coupling as defined in claim 1 wherein said hose is held in fixed sealed relation to the sleeve and the insert by means of a series of crimps along said sleeve and radially over said sealing and locking grooves whereby the hose is compressed and extruded within said sealing and locking grooves.

8. A hose coupling as defined in claim 7 wherein said tube is 3000 series aluminum alloy material and said insert is of a higher strength aluminum alloy than said tube, and said insert being of a wall thickness throughout said barrel portion to fully support the force of crimping the hose onto the barrel portion without deformation.

9. A method of making a tube-to-hose coupling wherein the tube comprises:

a metal tube having a longitudinal axis and being of substantially uniform wall thickness, a radially outwardly flared sleeve integral with said tube and providing a tube end, a radially extending tube stop shoulder being defined at the juncture at which said sleeve is flared outwardly;

said insert including (i) a barrel portion extending substantially the full length of said insert and (ii) a radially outwardly flared integral collar at one end of said barrel portion;

a flexible hose being held within the sleeve and supported on the insert barrel portion and abutting said hose end face of the collar; and said collar further including an O-ring for sealing the juncture between said sleeve and said collar;

said method comprising the steps of:

(a) inserting the O-ring on the insert collar, (b) inserting the insert into the hose, (c) inserting the combined insert and hose sub assembly within the sleeve to a point causing the insert to fully seat at its collar with the tube stop shoulder, (d) placing the hose and tube coupling in a subassembly within a crimping station, and (e) crimping the outer sleeve in a manner causing the crimp to engage the hose end face of the collar forcing it, together with the force of the extruded hose, against the tube stop shoulder;

whereby as the crimp progresses a resulting sleeve rib face will be formed at the hose end face of said collar and force the collar in the direction of said tube stop shoulder and simultaneously (i) slightly expanding said sleeve as the collar is brought into abutment with said tube stop shoulder and (ii) compressing said O-ring to a predetermined degree of compression ranging from about 75% to about 100% of filling said sealing groove.

* * * * *